United States Patent [19]
Chizawa et al.

[11] Patent Number: 6,014,280
[45] Date of Patent: *Jan. 11, 2000

[54] ERASING APPARATUS HAVING A TIMER TO RELEASE THE ERASE STANDBY MODE

[75] Inventors: Noriyoshi Chizawa, Yokohama; Kunio Tsuruno, Tokyo; Hiroyoshi Misumi, Yokohama, all of Japan

[73] Assignee: Canon Kabushiki Kaisha, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/362,754

[22] Filed: Dec. 22, 1994

Related U.S. Application Data

[63] Continuation of application No. 08/185,230, Jan. 24, 1994, abandoned, which is a continuation of application No. 07/899,139, Jun. 16, 1992, abandoned, which is a continuation of application No. 07/370,990, Jun. 26, 1989, abandoned.

[30] Foreign Application Priority Data

Jun. 29, 1988 [JP] Japan .................................. 63-163114

[51] Int. Cl.$^7$ ........................................................ G11B 5/03
[52] U.S. Cl. .............................. 360/66; 386/63; 386/121
[58] Field of Search .......................... 360/66, 51; 369/19; 358/188; 455/181, 231, 181.1; 368/10, 108; 348/725; 386/46, 63, 121, 120

[56] References Cited

U.S. PATENT DOCUMENTS

| | | | |
|---|---|---|---|
| 4,325,081 | 4/1982 | Abe et al. | 455/181 |
| 4,626,909 | 12/1986 | Oniki et al. | 455/181 |
| 4,849,832 | 7/1989 | Yamagata et al. | 360/66 |
| 5,043,831 | 8/1991 | Muramoto et al. | 360/66 |

*Primary Examiner*—Alan Faber
*Attorney, Agent, or Firm*—Fitzpatrick, Cella, Haper & Scinto

[57] ABSTRACT

An erasing apparatus in which an erase standby mode is set before executing an erase operation. Circuitry is provided for measuring an elapsed time of the erase standby mode during which the erasing operation is not executed. Circuitry is provided for automatically releasing the erase standby node in accordance with a measuring result of the measuring circuitry.

22 Claims, 5 Drawing Sheets

ERASING APPARATUS HAVING A TIMER TO RELEASE THE ERASE STANDBY MODE

This application is a continuation of application Ser. No. 08/185,230 filed Jan. 24, 1994, which is a continuation of Ser. No. 07/899,139, filed Jun. 16, 1992, which is a continuation of Ser. No. 07/370,990, filed Jun. 26, 1989, all now abandoned.

BACKGROUND OF THE INVENTION

1. Field of the Invention

The present invention relates to an erasing apparatus and, more particularly, to an apparatus in which in the erasing mode, after the apparatus was once set to the erase standby mode, the erasure is executed.

2. Related Background Art

Hitherto, in such an apparatus, as a method of releasing the erase standby mode, the erase standby mode is released by executing a function other than the erasing function. Such a construction has already been proposed by the same assignee as the present invention.

The conventional construction has the following drawbacks since the releasing operation is needed in the case of releasing the erase standby mode.

(1) In the erase standby mode, a danger such that the erasure is erroneously executed due to the erroneous operation is high.

(2) The operating efficiency is bad because the operation to release the erase standby mode is needed.

SUMMARY OF THE INVENTION

It is an object of the present invention to provide an erasing apparatus in which the operating efficiency is improved in consideration of the foregoing drawbacks.

Under such an object, it is another object of the invention to provide an erasing apparatus in which the erroneous erasure by the erroneous operation is prevented.

Under the above objects, according to a preferred embodiment of the invention, there is disclosed an erasing apparatus in which in the erasing mode, the erasure is once executed in accordance with an erase instruction after the erase standby mode, the apparatus comprises: means for measuring the continuation time of the erase standby mode; and means for releasing the erase standby mode in accordance with the time value of the timing means.

Still another object of the invention is to provide an erasing apparatus in which the number of operating parts is reduced.

A object of the invention is to provide an erasing apparatus in which, even in the erasing apparatus in which the number of operating parts is reduced, the erroneous erasure is prevented.

Another object of the invention is to provide an erasing apparatus having various kinds of functions with a simple construction.

The above and other objects and features of the present invention will become apparent from the following detailed description and the appended claims with reference to the accompanying drawings.

BRIEF DESCRIPTION OF THE DRAWINGS

FIG. 1 (comprising FIGS. 1A, 1B-1 and 1B-2) is a operation flowchart of the first embodiment;

DETAILED DESCRIPTION OF THE PREFERRED EMBODIMENT

In an embodiment of the present invention which will be explained hereinbelow, a still video (in which concentric tracks are formed on a magnetic disk called a video floppy and a video image of one picture plane is recorded on each track) is shown. However, the invention is not limited to such an apparatus, but can be also applied on a recording apparatus to record to an optical disk or a solid state memory. The invention can be also obviously applied to an apparatus to record information other than a video signal.

An embodiment of the invention will be described in detail hereinbelow with reference to the drawings.

Figures 1, 1A:
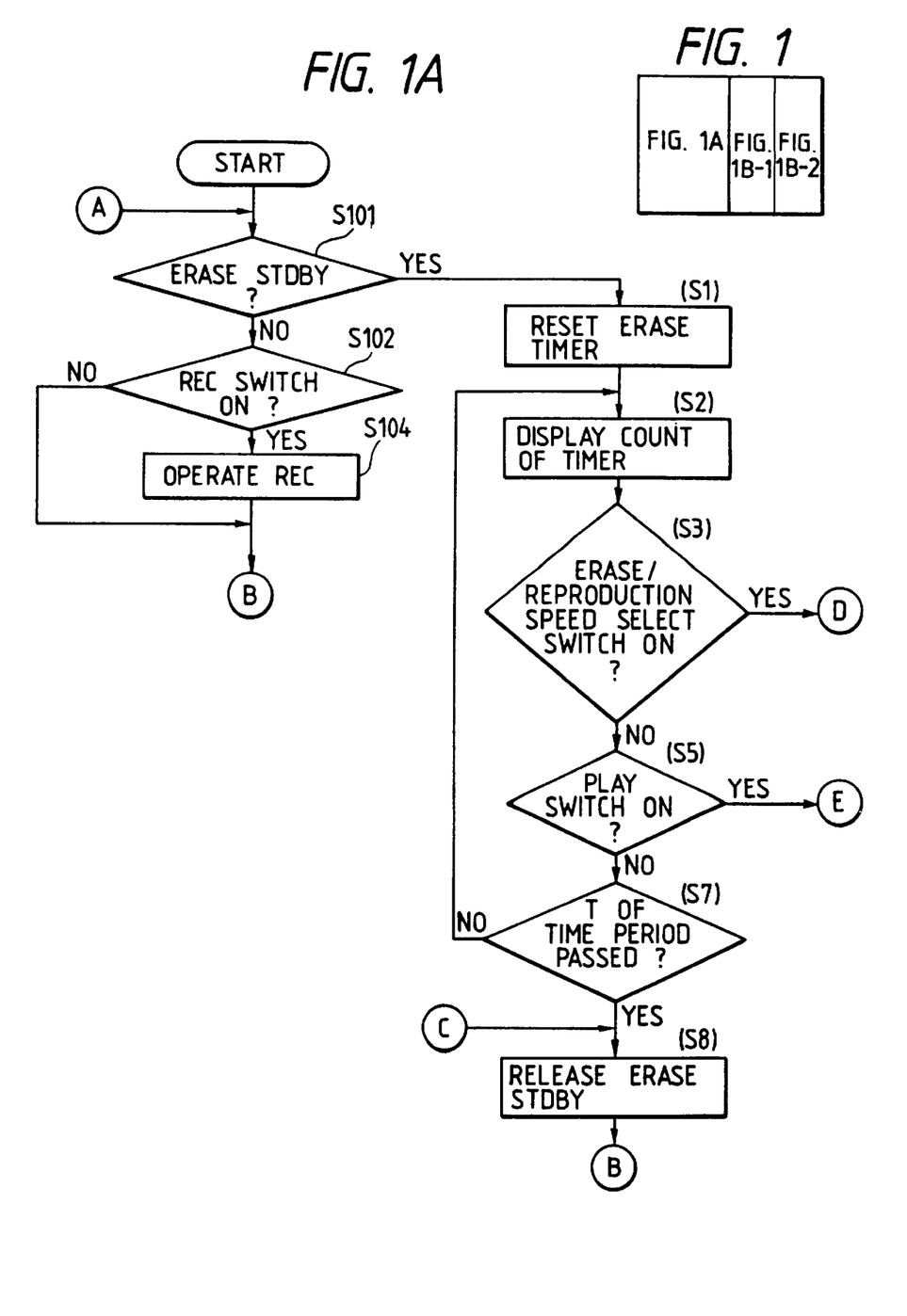
Figures 1B, 1B:
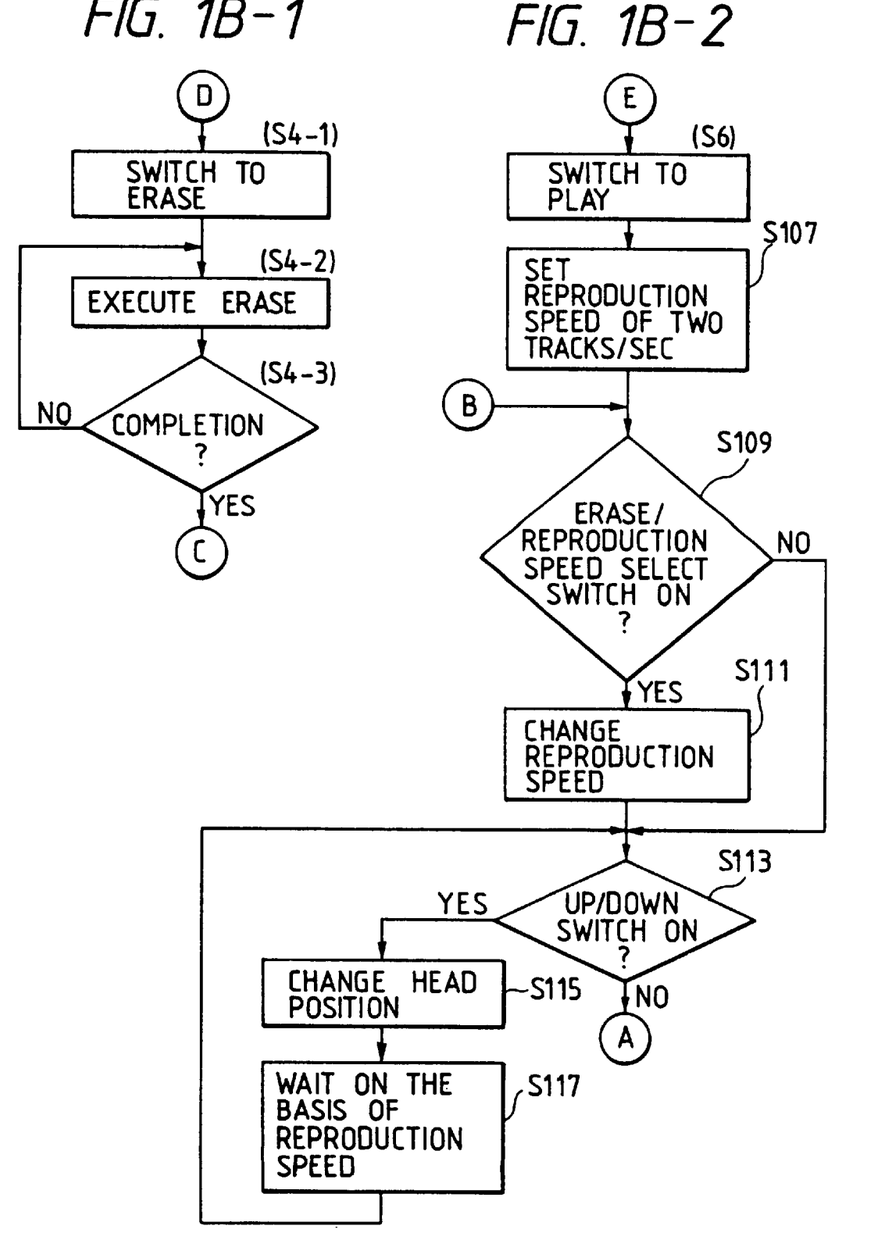
Figure 2:
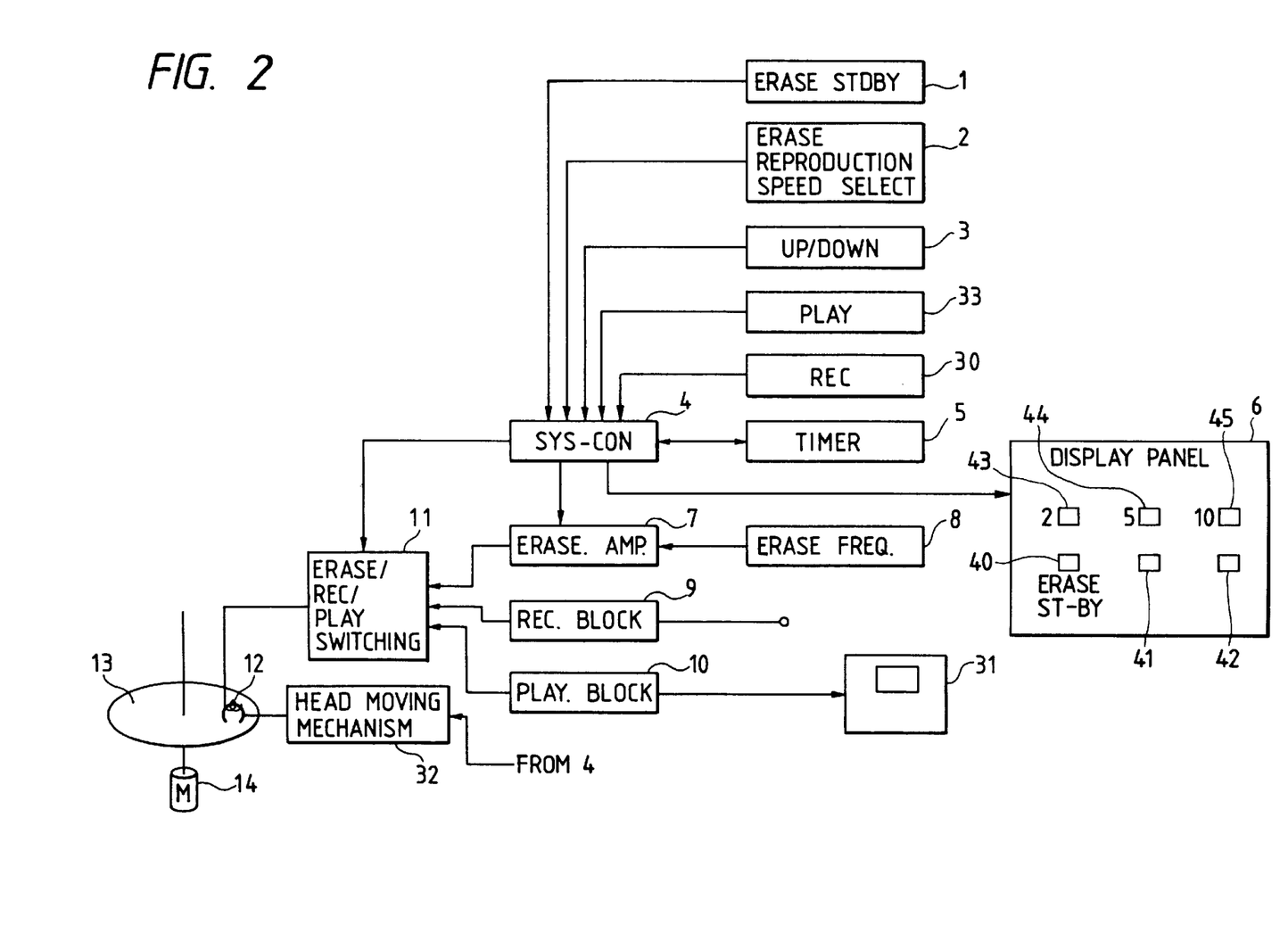
FIG. 2 is a circuit system diagram of the first embodiment of the invention.

FIGS. 1 and 2 show the first embodiment of the invention. FIG. 2 is a circuit system diagram. FIG. 1 is an operation flowchart for a system controller (hereinafter, referred to as a sys-con) 4 shown in FIG. 2.

In FIG. 2, reference numeral 1 denotes an erase standby switch and 2 indicates an erase/reproduction speed selecting switch. When the switch 2 is turned on in the erase standby mode, the erasing operation is executed. When the switch 2 is turned on in a mode other than the erase standby mode, the reproduction speed is sequentially selected. Reference numeral 3 denotes a track up/down switch to perform a reproduction track feed. Reference numeral 30 denotes a recording switch to execute the recording operation. The sys-con 4 is connected to the erase standby switch 1, selecting switch 2, up/down switch 3, recording switch 30, and play switch 33 and controls the circuit system. A timer 5 is also connected to the sys-con 4 and starts a counting operation by turning on the erase standby switch 1. After an elapse of a predetermined time T, the timer 5 is reset. A display panel 6 is connected to the sys-con 4 and displays the erase standby mode, track No., erasure, or the like.

An oscillator 8 is connected to an erase amplifier 7 and oscillates an erasing frequency signal. A recording system block 9 executes a recording signal process such as modulation or the like to an input video signal. A play block 10 supplies a reproduced video signal to an external monitor 31. An erase/rec/play change-over switch 11 is connected to the sys-con 4 and switches among the recording, reproducing, and erasing operations. Reference numeral 12 denotes a recording/reproducing head; 13 indicates a video floppy 10 on which concentric tracks are formed; 14 is a motor to rotate the video floppy 13; and 32 is a head moving mechanism to move the head 12. In response to an instruction from the sys-con 4, the head 12 is moved in the inner or outer rim direction on the floppy 13. Reference numeral 30 denotes a switch to indicate the recording operation and 33 represents the play switch at indicate the switching to the play block to the switch 11.

The operation of the embodiment constructed as mentioned above will now be described with reference to a flowchart shown in FIG. 1.

In FIG. 1, the sys-con 4 checks to see if the erase standby switch 1 has been turned on or not (step S101). If the switch 1 has been turned on, the following operations are executed.

(S1) By turning on the erase standby switch 1, the sys-con 4 is set to the erase standby mode.

(S2) The timer 5 starts the counting operation and the erase standby mode is displayed on the display panel 6 and external monitor 31.

(S3) After the erase standby mode has been set in (S1), a check is made to see if the erase/reproduction speed selecting switch 2 has been turned on or not. If the switch 2 has been turned on, step S4-1 follows. If the switch 2 is not turned on, step S5 follows.

(S4-1, S4-2) The sys-con 4 is set to the erase executing mode, the timer 5 is reset, and the erasure is displayed on the display panel 6 and external monitor 31. In step S4-1, the switch 11 is switched to connect the head 12 to the erase amplifier 7. The erasing operation is executed at the oscillating frequency from the oscillator 8.

(S5) On the other hand, a check is made to see if the play switch 33 has been turned on or not within the predetermined time T after the erasing standby mode was set. If the play switch 33 has been turned on, step S6 follows. If NO, step S7 follows.

(S6) The sys-con 4 is set to the standby mode, the timer 5 is reset, the display panel 6 and external monitor 31 release the display of the erase standby mode, and the reproducing operation, which will be explained hereinafter, is executed.

(S7) On the other hand, a check is made to see if the predetermined time T has elapsed after the erase standby mode had been set or not. If NO, the processing routine is returned to step S2. If YES, step S8 follows.

(S8) Since the elapse of the time T was detected in this case, in this step, the timer 5 is reset, the sys-con 4 releases the erase standby mode and enters the waiting mode, and the display panel 6 and external monitor 31 also release the display of the erase standby mode. Then, the processing routine advances to (B).

In step S101, if the standby switch 1 is not turned on, a check is made in step S102 to see if the switch 30 has been turned on or not. If the switch 30 has been turned on, the switch 11 is switched to the recording system block in step S104, the recording is executed by the head 8, and the switch 11 is again switched to the play block (S104). If the switch 30 is not turned on in step S102, the processing routine advances to (B).

The flow subsequent to (S6) will now be described. After the switch 11 was switched to the play block in step S6, the reproduction speed, that is, the speed to move the head 12 which is indicated by the switch 3 is set to the speed corresponding to two tracks per second (S107).

A check is then made to see if the selecting switch 2 has been turned on or not (S109). If YES, the reproduction speed is changed in step S111. In the embodiment, the following three kinds of reproduction speeds are provided. That is, there are the speeds to move two, five, and ten tracks per second. The sys-con 4 cyclically changes the speed in accordance with the next of 2→5→10→2 every time the switch 2 is turned on. The speed change is displayed on the display panel 6.

In the next step S113, a check is made to see if the up/down switch 3 has been turned on or not. If YES, the head 12 is moved in the direction indicated by the switch 3, that is, to the inner or outer rim side of the floppy 13 by the distance corresponding to one track (S115). Next, the apparatus is set to the waiting mode for the predetermined time corresponding to the reproducing speed set as mentioned above. In other words, in the case of the reproducing speed of two tracks/sec, the waiting time is set to about 0.5 second. If it is 5 tracks/sec, the waiting time is 0.2 second. If it is 10 tracks/sec, the waiting time is about 0.1 second. After the elapse of the waiting time, the processing routine is returned to step S113. Strictly speaking, the above predetermined time slightly differs because the time interval when the head 12 moves between tracks exists. If the switch 3 is not turned on in step S113, the processing routine is returned to step S101 and the above-mentioned flow 1 is repeated.

Figure 3:
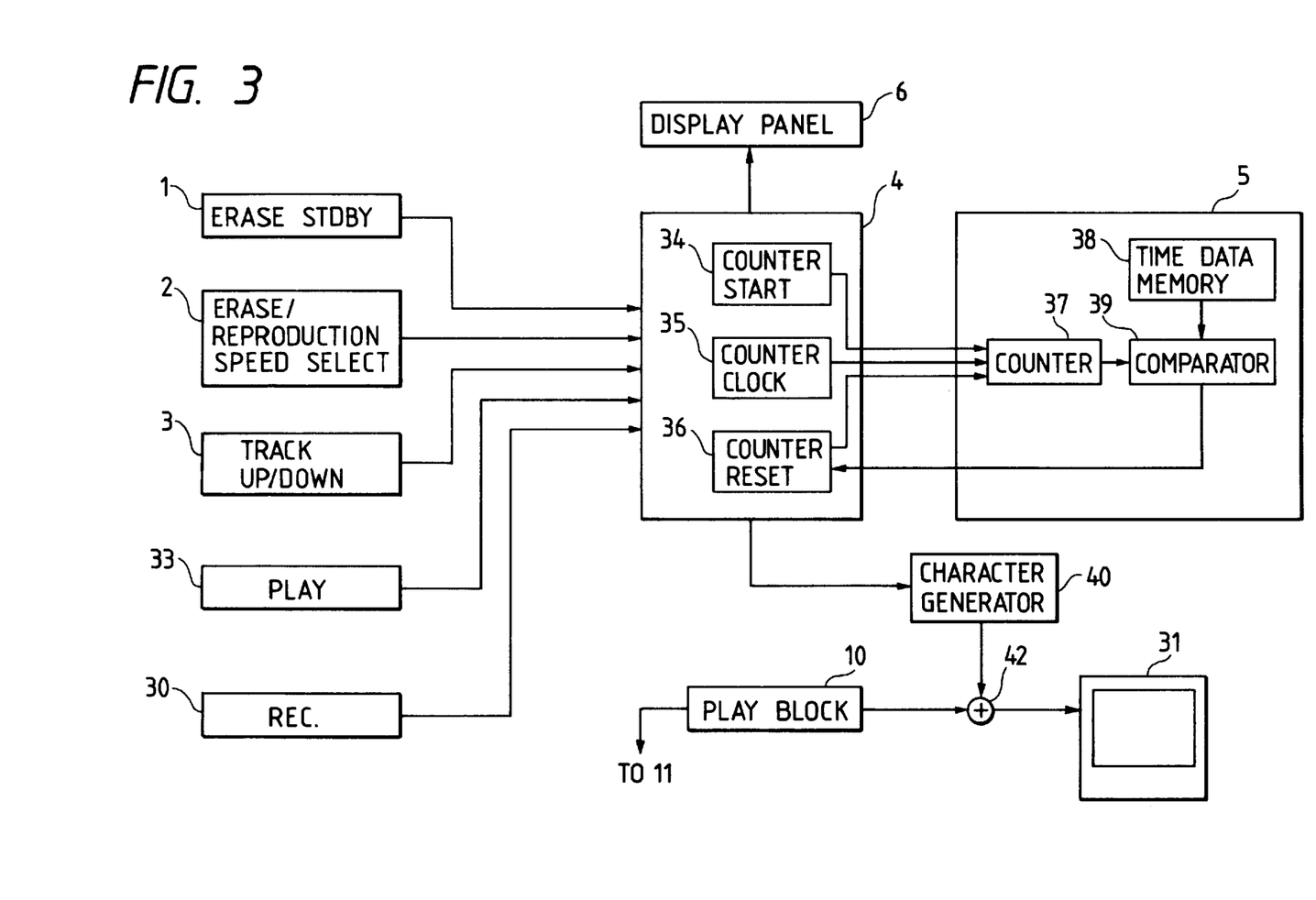
FIG. 3 is a block diagram showing a construction of the main section shown in FIG. 2.

FIG. 3 is a block diagram for explaining the timer operation in the embodiment. In FIG. 3, the same parts and components as those shown in FIG. 1 are designated by the same reference numerals and their descriptions are omitted. The sys-con 4 in the diagram includes: a start signal generating circuit to give a count start command to a counter 37 provided in the timer 5; a reset signal generating circuit to give a reset command; and a clock generating circuit to generate clocks to the counter 37. The timer 5 includes: the foregoing counter; a time data memory 38 to generate the time data T; and a comparator 39 to compare an output of the counter 37 with an output of the time data memory 38.

In the embodiment, there are provided a character generator 40 to display the output from the sys-con 4 onto the monitor 31 and an adder 42 to add an output of the character generator 40 to an output of the play block 10.

In the circuit constructed as mentioned above, when the track up/down switch 3 is turned on, the sys-con 4 detects the number of track the which is at present being reproduced and displays the track No. on the display panel 6. At the same time, the sys-con 4 displays the track No. on the external monitor 31 through the play block 10. Further, after the counter 37 was reset by a counter reset block 36, the counter 37 is started by a counter start block 34. In the timer 5, the predetermined time data T in the memory 38 and output data t of the counter 37 are always compared by the comparator 39. When the condition of $t \geq T$ is satisfied, the sys-con 4 erases the track No. displayed on the external monitor 31 through the play block 10.

In a manner similar to the above, when either one of the other switches 1, 2, 30, and 33 was turned on as well, a counter start signal is output to the counter 37 and an erase release signal is output to the character generator 40 in accordance with an output from the comparator 39. After the elapse of the predetermined time T, the data of the operating mode, track No., reproduction speed, and the like which are displayed on the external monitor 31 are automatically deleted. That is, in the embodiment, since a common counter is used to control the on/off switching of the character displays on various monitors, the construction is simplified.

Figure 4:
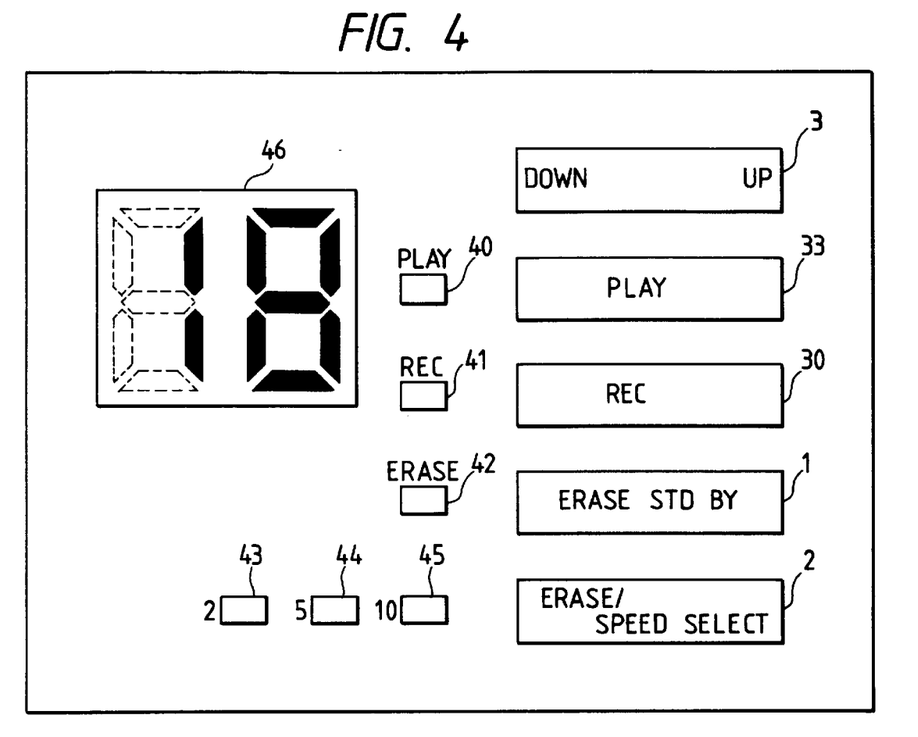
FIG. 4 is a diagram showing a front panel of the apparatus of the embodiment.

FIG. 4 is a diagram showing the front panel of the apparatus whose construction is shown in FIG. 2. The parts and components having the same functions as those of the components shown in FIG. 2 are designated by the same reference numerals. In FIG. 4, reference numeral 40 denotes an LED to show the play mode; 41 indicates an LED to show the recording mode; and 42 is an LED to show the erasing mode. The LED 42 flickers in the erase standby mode and is turned on in the erase executing mode. Reference numerals 43, 44, and 45 denote LEDs to show the reproduction speed, in which the LED 43 is turned on at the speed of two frames/sec, the LED 44 is turned on at the speed of five frames/sec, and the LED 45 is turned on at the speed of ten frames/sec. Reference numeral 46 represents an LED of seven segments to display the track number.

Figure 5:
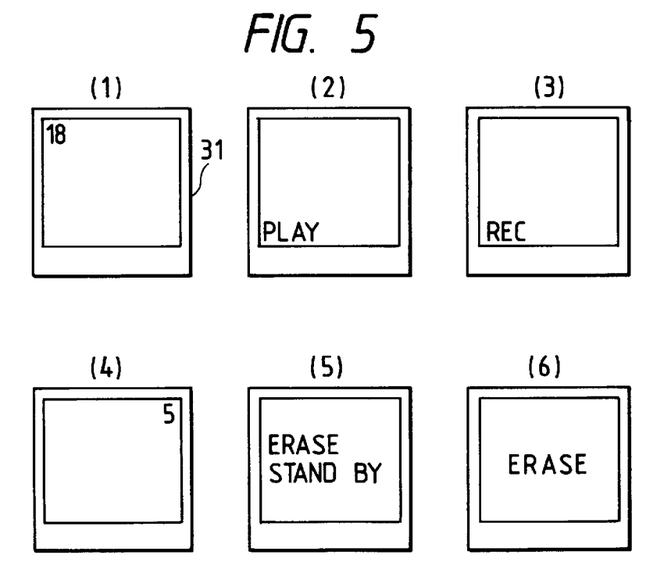
FIG. 5 is a diagram showing an example of characters which are displayed on a monitor 31 in FIG. 2.

FIG. 5 shows the display contents such as operating mode, track No., and the like on the external monitor 31.

In the diagram, (1) shows the display of the track No., (2) shows the display of the play mode, (3) shows the display of the recording mode, (4) shows the display of the reproduction speed, (5) shows the display of the erase standby mode, and (6) shows the display of the erasing mode, respectively. Such displays are executed by the character generator 40 in a manner as shown in FIG. 5.

On the other hand, the display in the erase standby mode is not executed as shown in (5) but may be performed such that the characters of "ERASE" are turned on as shown in (6), while they are allowed to flicker in the erasing mode.

As described above, according to the embodiment, timer mechanism to release the erase standby mode is provided, and in the erase standby mode, by releasing the erase standby mode on the basis of the output of the timer or the execution of a function other than the erasure, there are advantages such that a danger of the erroneous erasure due to the erroneous operation can be reduced, the operating efficiency can be improved, and the construction can be simplified.

In the foregoing circuit, on the other hand, the erase/reproduction speed selecting switch 2 has been commonly used as both of an erase switch and a reproduction speed switch. Therefore, in the case where after the user had once set the erase standby mode, he turned on the switch 2 to change the reproduction speed because he forgot the setting of the erase standby mode, the image signal which should not be erased is erroneously erased. However, in the embodiment, since the erase standby mode is released by the timer, such a problem does not occur.

On the other hand, in the embodiment, in the erase standby mode, the switching operation of the switch 3 is not accepted by the loop of (S2), (S3), (S5), and (S7). Therefore, it is also possible to prevent that the wrong track from being erased.

According to the embodiment, in the erase standby mode, when the switch 33 is turned on, the other operation is preferentially been executed. However, the erase standby mode can be also held without accepting the other operations.

As described above, according to the embodiment, the operating efficiency is high and the occurrence of erroneous erasure can be prevented.

The present invention is not limited to the foregoing embodiments but many modifications and variations are possible within the spirit and scope of the appended claims.

We claim:

1. A reproducing apparatus having a function for reproducing information stored in a storage medium and a function for erasing the information stored in the storage medium, comprising:

an erasing operation standby instruction switch for inputting an instruction to set an operation state of said reproducing apparatus to an erasing operation standby state to erase the information stored in the storage medium;

measuring means for measuring an elapsed time of the erasing operation standby state after said reproducing apparatus is set to the erasing operation standby state by said erasing operation standby instruction switch;

an erasing operation start instruction switch for inputting an instruction to set an operation state of said reproducing apparatus to an erasing operation start state to erase the information stored in the storage medium;

a reproducing operation start instruction switch for inputting an instruction to set an operation state of said reproducing apparatus to a reproducing operation start state to reproduce the information stored in the storage medium; and a controller for (i) shifting the operation state of said reproducing apparatus from the erasing operation standby state to the erasing operation start state when the instruction is input by said erasing operation start instruction switch before the elapsed time measured by said measuring means reaches a predetermined time, or (ii) shifting the operation state of said reproducing apparatus from the erasing operation standby state to the reproducing operation start state when the instruction is input by said reproducing operation start instruction switch, or (iii) shifting the operation state of said reproducing apparatus from the erasing operation standby state to the reproducing operation standby state when the elapsed tire measured by said measuring means reaches a predetermined time without input of the instruction by said erasing operation start instruction switch and without input of the instruction by said reproducing operation start instruction switch.

2. An apparatus according to claim 1, wherein, each of said erasing operation standby instruction switch and said erasing operation start instruction switch includes a single switch which is operated manually.

3. A reproducing apparatus having a function for reproducing information stored in a storage medium and a function for erasing the information stored in the storage medium, comprising:

an erasing operation standby instruction switch for inputting an instruction which sets an operation state of said reproducing apparatus to an erasing operation standby state to erase the information stored in the storage medium;

an erasing operation start instruction switch for inputting an instruction to start an erasing operation of the information stored in the storage medium after the operation state of said reproducing apparatus is set to the erasing operation standby state by said erasing operation standby instruction switch;

erasing means for erasing the information stored in the storage medium in response to the instruction of the start of the erasing operation by said erasing operation start instruction switch;

measuring means for measuring an elapsed time of the erasing operation standby state after said reproducing apparatus is set to the erasing operation standby state by said erasing operation standby instruction switch;

a reproducing operation start instruction switch for inputting an instruction which sets an operation state of said reproducing apparatus to a reproducing operation start state to reproduce the information stored in the storage medium; and a controller for (i) shifting the operation state of said reproducing apparatus from the erasing operation standby state to the erasing operation start state when the instruction is input by said erasing operation start instruction switch before the elapsed time measured by said measuring means reaches a predetermined time, or (ii) shifting the operation state of said reproducing apparatus from the erasing operation standby state to the reproducing operation start state when the instruction its input by said reproducing operation start instruction switch and inhibiting the information stored in the storage medium from being erased by said erasing means in response to the input of the instruction by said erasing operation start instruction switch, or (iii) shifting the operation state of said reproducing apparatus from the erasing operation standby state to the reproducing operation standby state when the elapsed time measured by the measuring leans reaches a predetermined time without input of the instruction by said erasing operation start instruction switch and without input of the instruction by said reproducing operation start instruction switch.

4. An apparatus according to claim 3, wherein each of said erasing operation standby instruction switch and said erasing operation start instruction switch includes a single switch which is operated manually.

5. An apparatus according to claim 3, wherein said erasing means comprises means for erasing image information stored in the storage medium.

6. An apparatus according to claim 3, wherein said erasing means is arranged so as to erase the information stored in the storage medium by replacing the information stored in the storage medium with new information.

7. An apparatus according to claim 3, wherein the storage medium comprises a disk shaped recording medium.

8. An apparatus according to claim 3, wherein said information comprises image information.

9. A reproducing apparatus having a function for reproducing information stored in a storage medium and a function for erasing the information stored in the storage medium, comprising:

a first instruction switch for inputting an instruction which sets an operation state of said reproducing apparatus to an erasing operation standby state to erase the information stored in the storage medium;

a second instruction switch for inputting an instruction to start an erasing operation of the information stored in the storage medium after the operation state of said reproducing apparatus is set to the erasing operation standby state by said first instruction switch;

a third instruction switch for inputting an instruction to start a reproducing operation of desired information from the information stored in the storage medium;

erasing means for erasing the information stored in the storage medium in response to the instruction to start the erasing operation input by said second instruction switch;

reproducing means for reproducing the desired information stored in the storage medium in response to the instruction for reproducing the desired information input by said third instruction switch;

measuring means for measuring an elapsed time of the erasing operation standby state after said reproducing apparatus is set to the erasing operation standby state by said first instruction switch; and a controller for (i) shifting the operation state of said reproducing apparatus from the erasing operation standby state to the erasing operation start state when the instruction is input by said second instruction switch before the elapsed time measured by said measuring means reaches a predetermined time, or (ii) shifting the operation state of said reproducing apparatus from the erasing operation standby state to the reproducing operation start state when the instruction is input by said third instruction switch and inhibiting the information stored in the storage medium from being erased by said erasing means in response to the input of the instruction by said second instruction switch, or (iii) shifting the operation state of said reproducing apparatus from the erasing operation standby state to the reproducing operation standby state when the elapsed time measured by said measuring means reaches a predetermined time without input of the instruction by said second instruction switch and without input of the instruction by said third instruction switch.

10. An apparatus according to claim 9, wherein said reproducing means includes a head for reproducing the information stored in the storage medium.

11. An apparatus according to claim 9, wherein said second instruction means comprises switch for setting an interval in which the information stored in the storage medium is reproduced when the information stored in the storage medium is reproduced by said reproducing means.

12. A reproducing apparatus having a function for reproducing information stored in a storage medium and a function for erasing the information stored in the storage medium, comprising:

an erasing operation standby instruction switch for inputting an instruction to set an operation state of said reproducing apparatus to an erasing operation standby state to erase the information stored in the storage medium;

measuring means for measuring an elapsed time of the erasing operation standby state after said reproducing apparatus is set to the erasing operation standby state by said erasing operation standby instruction switch;

an erasing operation start instruction switch for inputting an instruction to set an operation state of said reproducing apparatus to an erasing operation start state to erase the information stored in the storage medium; and a controller for (i) shifting the operation state of said reproducing apparatus from the erasing operation standby state to the erasing operation start state when the instruction is input by said erasing operation start instruction switch before the elapsed time measured by said measuring means reaches a predetermined time, or (ii) shifting the operation state of said reproducing apparatus from the erasing operation standby state to another operation state when the elapsed time measured by said measuring means reaches a predetermined tine without input of the instruction by said erasing operation start instruction switch.

13. Apparatus according to claim 12, wherein each of said erasing operation standby instruction switch and said erasing operation start instruction switch includes a single switch which is operated manually.

14. A reproducing apparatus having a function for reproducing information stored in a storage tedium and a function for erasing the information stored in the storage medium, comprising:

an erasing operation standby instruction switch for inputting in instruction which sets an operation state of said reproducing apparatus to an erasing operation standby state to erase the information stored in the storage medium;

an erasing operation start instruction switch for inputting an instruction to start an erasing operation of the information stored in the storage medium after the operation state of said reproducing apparatus is set to the erasing operation Standby state by said erasing operation standby instruction switch;

erasing means for erasing the information stored in the storage medium in response to the instruction of the start of the erasing operation by said erasing operation start instruction switch;

measuring means for measuring an elapsed time of the erasing operation standby state after said reproducing apparatus is set to the erasing operation standby state by said erasing operation standby instruction switch; and a controller for each of (i) shifting the operation state of said reproducing apparatus from the erasing operation standby state to the erasing operation start state when the instruction is input by said erasing operation start instruction switch before the elapsed time measured by said measuring means reaches a predetermined time, or (ii) shifting the operation state of said reproducing apparatus from the erasing operation standby state to another operation state when the elapsed time measured by the measuring means reaches a predetermined time without input of the instruction by said erasing operation start instruction switch.

15. Apparatus according to claim 14, wherein each of said erasing operation standby instruction switch and said erasing operation start instruction switch includes a single switch which is operated manually.

16. Apparatus according to claim 14, wherein said information comprises image information.

17. Apparatus according to claim 16, wherein said erasing means comprises means for erasing image information stored in the storage medium.

18. Apparatus according to claim 14, wherein said erasing means erases the information stored in the storage medium by replacing the information stored in the storage medium with new information.

19. Apparatus according to claim 14, wherein the storage medium comprises a disk-shaped recording medium.

20. A reproducing apparatus having a function for producing information stored in a storage medium and a function for erasing the information stored in a storage medium, comprising:

a first instruction switch for inputting an instruction which sets an operation state of said reproducing apparatus to an erasing operation standby state to erase the information stored in a storage medium;

a second instruction switch for inputting an instruction to start an erasing operation of the information stored in the storage medium after the operation state of said reproducing apparatus is set to the erasing operation standby state by said first instruction switch;

a third instruction switch for inputting an instruction to start a reproducing operation of desired information from the information stored in a storage medium;

erasing means for erasing the information stored in a storage medium in response to the instruction to start the erasing operation input by said second instruction switch;

reproducing means for reproducing the desired information stored in a storage medium in response to instruction for reproducing the desired information input by said third instruction switch;

measuring means for measuring an elapsed time of the erasing operation standby state after said reproducing apparatus is set to the erasing operation standby state by said first: instruction switch; and controller for (i) shifting the operation state of said reproducing apparatus from the erasing operation standby state to the erasing operation standby state when the instruction is input by said second instruction switch before the elapsed time measured by said measuring means reaches a predetermined time, or (ii) shifting the operation state of said reproducing apparatus from the erasing, operation standby state to another operation state when the elapsed time measured by said measuring means reaches a predetermnined time without input of the instruction by said second instruction switch.

21. Apparatus according to claim 20, wherein said reproducing means includes a head for reproducing the information stared in the storage medium.

22. Apparatus according to claim 20, wherein said second instruction switch comprises a switch for setting an interval an which the information stored in the storage medium is reproduced when the information stored in the storage medium is reproduced by said reproducing means.

* * * * *